Nov. 3, 1964 S. H. CREED 3,155,218
ARTICLE FEEDING MECHANISM
Filed Feb. 19, 1962 2 Sheets-Sheet 1
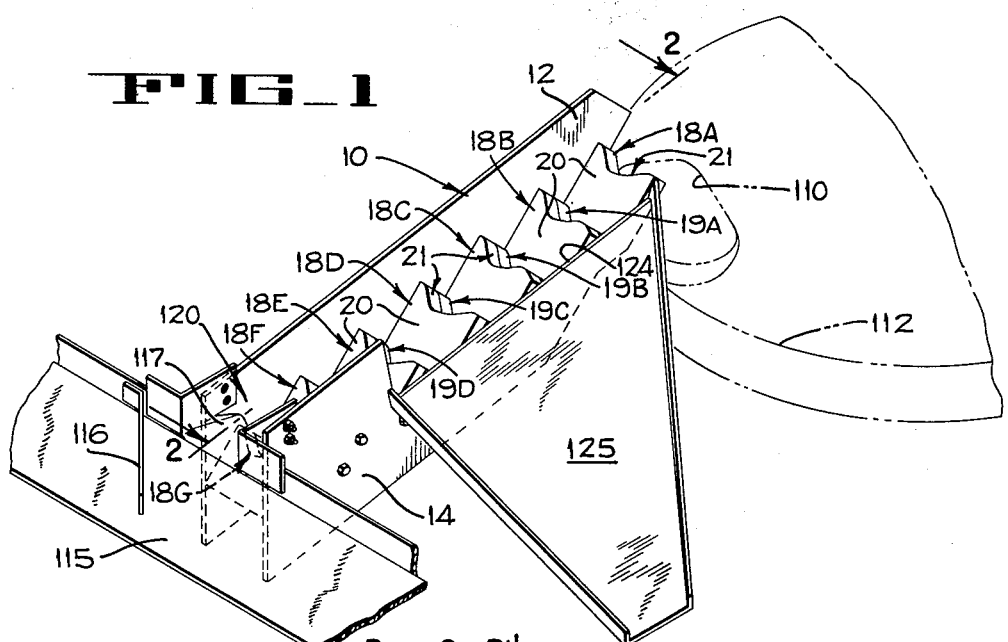
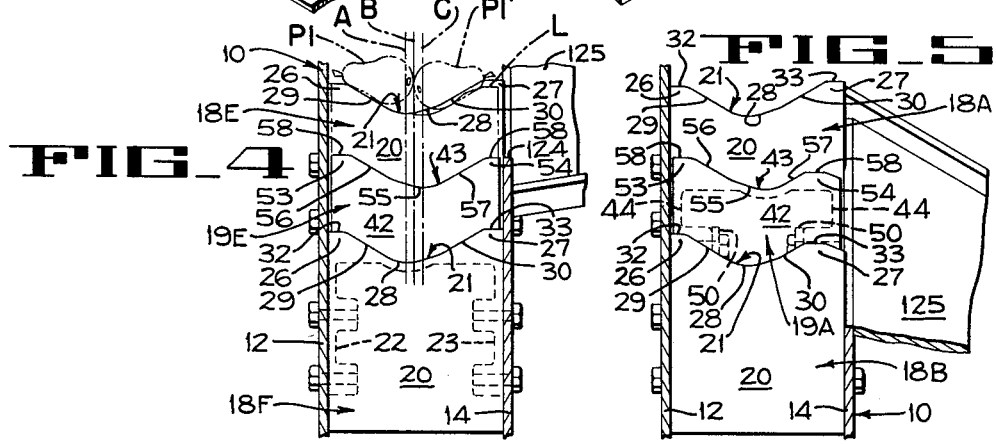
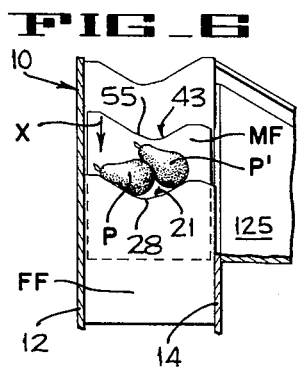
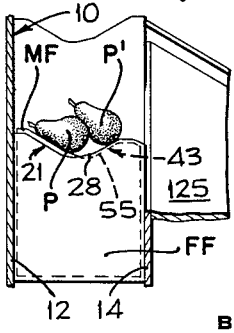
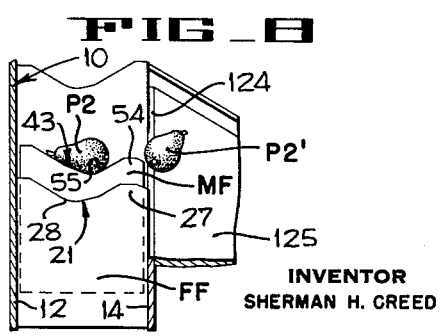
INVENTOR
SHERMAN H. CREED
BY Hans F. Hoffmeister
ATTORNEY

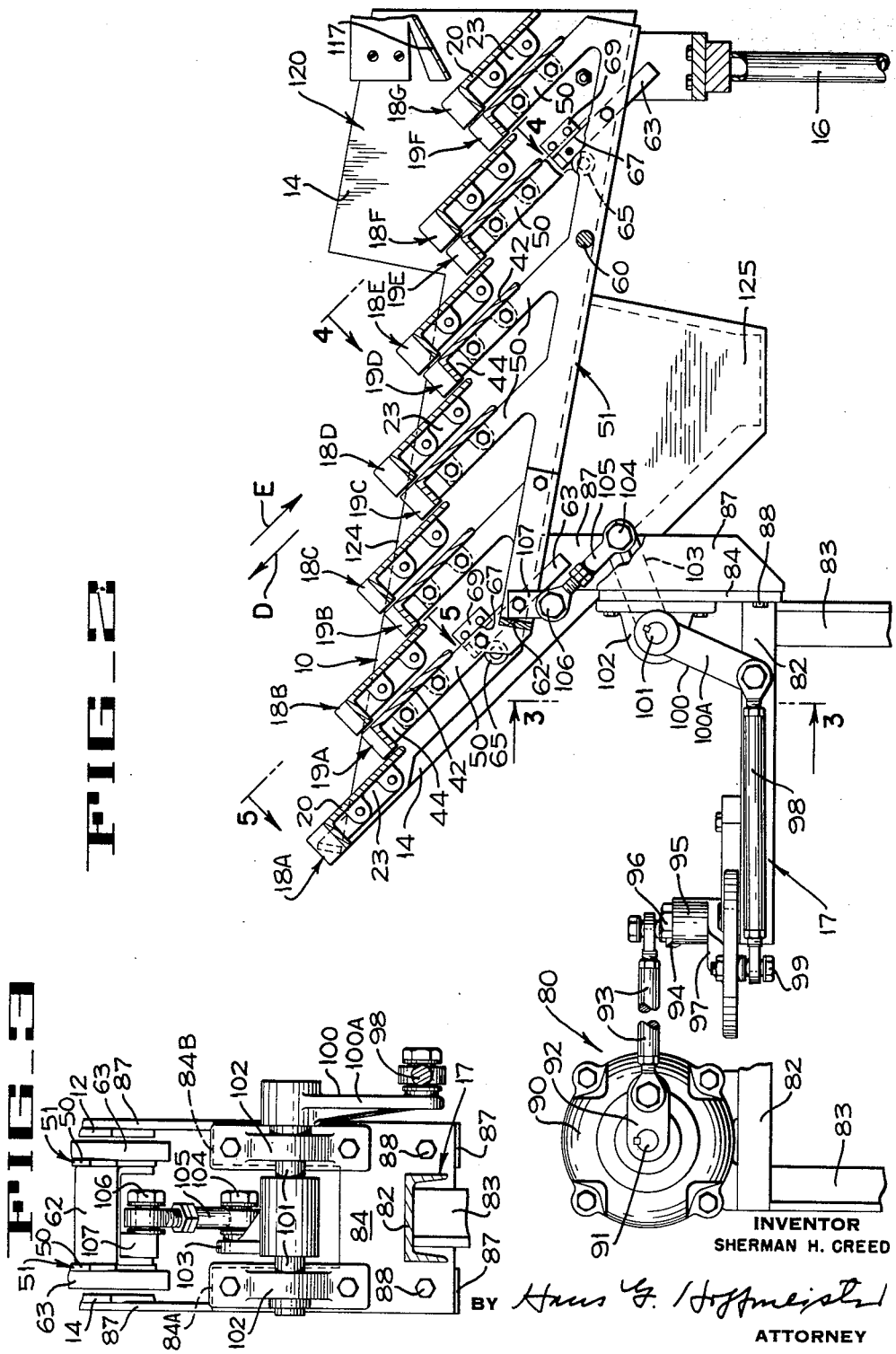

United States Patent Office 3,155,218
Patented Nov. 3, 1964

3,155,218
ARTICLE FEEDING MECHANISM
Sherman H. Creed, San Jose, Calif., assignor to FMC Corporation, San Jose, Calif., a corporation of Delaware
Filed Feb. 19, 1962, Ser. No. 174,012
8 Claims. (Cl. 198—30)

This invention pertains to article feeding apparatus, and more particularly concerns an improved feed mechanism of the shuffle feed type.

Many types of machines process articles one by one and, accordingly, it is necessary that the articles be supplied to these machines one at a time at regularly spaced intervals. Therefore, to efficiently supply articles to such machines, a feed mechanism must be capable of receiving quantities of articles in random formation, such as they would assume when assembled in a group at the bottom of a supply chute, and arrange the articles in single file.

Shuffle type feeders have been proposed for this type of service and have proved partially satisfactory since the relative movement of the stationary and reciprocating members of a shuffle feeder have a tendency to arrange articles in single file. However, it sometimes happens that two articles are moved along the feeder in side-by-side relation and cannot be separated before they are discharged from the feeder to the processing machine.

It is therefore an object of the present invention to provide an article feed mechanism capable of receiving articles in a random grouping, arrange the articles in single file, and discharge them one-by-one into a processing machine.

Another object is to provide a mechanism particularly adapted to move two articles from a side-by-side position to a single file position.

Another object is to provide an improved shuffle-type article feeder.

Another object is to provide means for separating two articles moving along a shuffle feed mechanism and positioning one of the articles in front of the other.

Other and further objects and features of the present invention will be apparent from the following description taken in connection with the accompanying drawings, in which:

FIGURE 1 is a diagrammatic perspective of a feed mechanism constructed in accordance with the teaching of the present invention, a portion of an associated supply conveyor being shown at the inlet end of the mechanism and a processing turret, to which articles are fed, being shown in phantom lines at the discharge end of the feed mechanism.

FIGURE 2 is an enlarged diagrammatic vertical section taken along line 2—2 of FIG. 1.

FIGURE 3 is a vertical section taken on line 3—3 of FIG. 2.

FIGURE 4 is a fragmentary diagrammatic section taken on line 4—4 of FIG. 2.

FIGURE 5 is a fragmentary diagrammatic section taken on line 5—5 of FIG. 2.

FIGURES 6, 7 and 8 are fragmentary diagrammatic sections, similar to FIGS. 4 and 5, and showing successive operating positions of the movable flights of the feed mechanism.

The embodiment of the feed mechanism chosen for illustration in FIGURE 1 comprises an upwardly extending sheet metal chute 10 having opposed side walls 12 and 14, each of which is supported at its forward end by an upstanding leg member 16 (FIG. 2) and at its rearward end by a support frame 17 which will be described presently. The floor of the chute 10 is formed by a plurality of stationary flights 18A–18G and movable flights 19A–19F. Each of the stationary flights is made of smooth rigid material and has a flat body portion 20 (FIG. 4), a curved upper edge 21, and two depending side flanges 22 and 23 that are bolted in the side walls 12 and 14, respectively. It will be noted in FIGS. 4 and 5 that the upper portion of each of the stationary flights 18A–18G comprises two upwardly projecting legs 26 and 27 defined by a curved lower edge portion 28, upwardly and outwardly inclined edges 29 and 30, and flat upper edges 32 and 33. Thus a pocket, on which articles come to rest as they are advanced, is formed on the upper end of each stationary flight by wall portions extending downwardly from the inclined edges 29 and 30 and by a curved wall portion extending downwardly from the curved edge 28. In the stationary flights 18A, 18D, 18E, 18F, and 18G, the legs 26 and 27 are of the same height so that the upper edges 32 and 33 of those flights are substantially in alignment transversely of the chute. However, in the stationary flights 18B and 18C, the leg 27 is about half as long as the leg 26 so that the upper edge 33 of each of these flights is lower than the opposite edge 32 shown in FIG. 5. Also, it will be noted that a vertical plane A passing through the lowest point of the curved lower portion 28 of the edge of each stationary flight is disposed to the left (FIG. 4) of a vertical plane B passing through the longitudinal centerline of the chute.

The movable flights 19A–19E, which are actually pusher members, are generally similar to the stationary flights 18A–18G, each movable flight comprising a flat body portion 42 (FIG. 5), an upper curved edge 43, and two depending flanges 44, each of which is bolted to a finger 50 of a slide frame 51 (FIG. 2).

As seen in FIG. 5, the upper portion of each movable flight comprises two upwardly projecting legs 53 and 54 defined by a curved lower edge portion 55, upwardly and outwardly inclined edges 56 and 57, and flat upper edges 58. The wall portions extending downwardly from the edges 55, 56 and 57 define a centering pocket on the article-contacting end surface of each pusher flight. In the movable flights 19C–19F, the legs 53 and 54 are of substantially the same length so that the upper edges 58 are in alignment. However, in flights 19A and 19B the legs 54 are about half as high as the legs 53. Also, it will be noted that a vertical plane C passing through the lowest portion of the curved edge 55 of each movable flight is disposed to the right (FIG. 4) of the vertical plane B passing through the longitudinal centerline of the chute. Accordingly, it will be apparent that the curved lower portions 28 of the stationary flights are displaced to the left (FIGURES 4 and 5) from the curved lower portions 55 of the movable flights.

There are two identical slide frames 51, one disposed adjacent the inner side of each side wall of the chute, and these two slide frames are connected for conjoint movement by a transverse bar 60 and a U-shaped bracket 62, one leg of which is bolted to each slide frame 51. Two of the fingers 50 of each slide frame are provided with bars 63 (FIG. 2) of rectangular cross-section, each bar being fixedly secured to the associated finger 50 and disposed between a roller 65 projecting inwardly from the adjacent wall of the chute and a ledge 67 provided by a stepped guide member 69 that is bolted to the chute wall.

The slide frames 51 and the movable flights secured thereon are reciprocated in the directions of arrows D and E (FIG. 2) by means of a drive unit 80 that is mounted on the support frame 17. The frame includes a table member 82, supported on legs 83, and a vertically disposed U-shaped bracket 84 that has upstanding legs 84A and 84B (FIG. 3) and is secured to the forward end of the table. The bracket 84 is fixedly secured by bolts 86 to laterally extending flanges of two vertical angle members 87, each of which is, in turn, secured to the outer face of one of the side walls 12 or 14 of the chute 10. The drive unit 80 includes an electric motor 90 that is mounted on the table 82 and has a crank 92 keyed to its output shaft 91. A rod 93 is pivoted at one end to the crank 92 and, at the other end, to one arm 94 of a bellcrank 95 that is pivotally mounted on the table by means of a bolt 96. The other arm 97 of the bellcrank is pivoted by means of a bolt 99 to a rod 98 which, in turn, is pivoted to one arm 100A of a second bellcrank 100 which is keyed to a shaft 101 rotatably journalled in two bearing blocks 102 (FIG. 3). A second lever 103 is also keyed to shaft 101 and is pivotally connected by a bolt 104 to a rod 105 which is pivoted at 106 to a short tab 107 secured to the U-shaped bracket 62 which connects the rearward ends of the two slide frames 51. It will be evident that, when the motor 90 is in operation, the bellcrank 95 is oscillated about the axis of bolt 96, causing the rod 98 to oscillate the second lever 103 about the axis of shaft 101. Accordingly, the rod 105 and the attached slide frames 51 are reciprocated in the direction of arrows D and E. During reciprocation of the slide frames 51, each movable flight 19A–19F moves between a lower position in which it underlies one of the fixed flights 18B–18G and an upper position overlying the fixed flight immediately above. In each position, the upper curved edge 43 of the movable flight is substantially in alignment with the upper curved edge 21 of the adjacent fixed flight.

The fruit, that is to be arranged in single file and fed into a cup 110 (FIG. 1) of a fruit-aligning turret 112, is deposited at the lower end of the chute 10 by any conventional supply mechanism such as a conveyor belt 115. A deflector 116 may be disposed over the upper surface of the belt 115 to intercept the fruit and direct it down a ramp 117 (FIG. 2) into a supply hopper 120 formed by the ramp 117, the side walls 12 and 14 of the chute 10, and the flights 18F, 18G, 19E and 19F.

The coaction of the fixed and movable flights in arranging the fruit in single file is illustrated in FIGURES 6, 7 and 8. In FIG. 6 two pears P and P' are shown resting on the curved edge 21 of a fixed flight indicated by the reference character FF. The movable flight MF is, at this time, midway in its downward movement, indicated by arrow X. When the flight MF reaches its lower position and its upper edge 43 becomes aligned with the upper edge 21 of the fixed flight FF, the pears drop downwardly so that they are in front of the two aligned curved edges as partly shown in FIG. 7 wherein the movable flight has not quite reached its lowest position. Then, when the movable flight is again moved upwardly, the pears are propelled upwardly. Sometime before the movable flight reaches its upper position, one of the pears usually attains a position in the curved lower portion 55 of the movable flight MF while the other pear drops off the movable flight and drops downwardly to the stationary flight it just left.

As mentioned above, the curved lower portions 28 of the stationary flights are displaced to the left (FIGURES 4 and 5) from the curved lower portions 55 of the movable flights. Accordingly, when the movable flights 19E (FIG. 4) reaches its uppermost position, as indicated by phantom line L in FIG. 4, the inclined edge 56 of flight 19E moves into alignment with the inclined edge 29 of fixed flight 18E. However, the opposite inclined edge 57 of flight 19E does not reach a position of alignment with edge 30 of fixed flight 18E and, as a result, a ledge-like portion of the fixed flight 18E remains under the pear being raised by the right side of the movable flight 19E. Therefore, if two pears P1 and P1' (FIG. 4) are elevated by the movable flight 19E, all support will be withdrawn from pear P1 and it will drop in front of edge 21 of flight 18E while pear P1' is still supported on the above-mentioned ledge. Accordingly, the pear P1 has a chance to move toward a central position on the flight 18E before the pear P1' drops onto the flight 18E. In many cases, due to the exposed ledge remaining on flight 18E, pear P1' will not drop onto flight 18E at all, and will return downwardly with flight 19E. Even if pear P1' does drop onto flight 18E, its position will be unstable since a portion of it will probably overlie the pear P1 which has started its movement toward the desired central position. Such an unstable position will, of course, have a tendency to cause pear P1' to drop back down the chute leaving pear P1 free to move to the central position.

Under certain conditions, two pears may become lodged in side-by-side position on the flights in such a manner that the inclined surfaces of the opposed legs 26, 27 and 53, 54 of the flights urge the pears toward each other and tend to keep the pears in this locked formation. To break up such formations, the legs 27 of the upper stationary flights 18B and 18C are made only about half as high as their associated legs 26, as previously mentioned, and the legs 54 of the movable flights 19A and 19B are made about half as high as their associated legs 53. Also, the side wall 14 (FIG. 1) of the chute 10 is cut away opposite the flights 18B, 18C, 19A and 19B to provide a lateral discharge port 124 which leads to a chute 125. Accordingly, as seen in FIG. 8, if two pears P2 and P2' are still locked in side-by-side position when they reach the flights 18B, 18C, 19A and 19B, the support usually provided by the full-height legs 27 and 54 of the lower flights is no longer present and the pear P2 on the left side (FIG. 8) pushes the pear P2' over the half-size legs 27 and 54 and out of chute 10 through the discharge port 124. While pushing the pear P2' out the discharge port, the left side pear P2 moves to the desired central position on the flights and is discharged over the upper end of the chute 10 into a cup 110 of the aligning turret 112.

While the several singulating actions of the flights have been described in connection with only two pears, it will be evident that these unique actions take place when more than two pears are positioned in front of the flights when the movable flight is in its lowered position. Such a condition will, of course, occur when a group of pears are deposited simultaneously in the hopper 120. It is, therefore, evident that, during normal operation the fixed and movable flights coact to move one or more pears upwardly while causing excess pears to drop back down the chute, until each movable flight carries only one pear upwardly to the fixed flight immediately above.

From the foregoing description it will be apparent that the present invention provides a simple, effective feed mechanism capable of receiving articles in random grouping and arranging the articles in single file. The concept of cutting off certain of the article-retaining legs of the flights so that the support for the article is withdrawn at one side of the article to cause the articles to be released laterally of the chute to drop out a lateral discharge port, makes possible a mechanism that is very effective in eliminating the possibility that two articles will be discharged simultaneously from the chute. Further, it is to be particularly noted that the present chute provides three types of singulating actions, namely, the usual singulating action of a shuffle feed mechanism, the action due to the cut off support legs of the flights and the lateral discharge port, and the singulating action due to the fact that an exposed ledge on each fixed flight retards the movement toward a central position of one of two articles that are carried upwardly by the flights. Each of these actions supplements the others so that only single articles are discharged from the upper end of the chute.

While a particular embodiment of the feed mechanism of the present invention has been shown and described, it will be understood that the mechanism is capable of modification and variation without departing from the principles of the invention, and that the scope of the invention should be limited only by the scope and proper interpretation of the claims appended hereto.

I claim.

1. In an article feed mechanism of the shuffle feed type comprising a plurality of spaced pusher members mounted between a pair of side walls of a chute for reciprocating movement relative to a plurality of stationary article-storing flights to advance articles step-by-step in a single file from one article-storing flight to the next, an opening in one of said side walls adjacent the path of movement of at least one of said reciprocating pusher members, and means on said one pusher member for urging articles adjacent such file laterally as they are advanced longitudinally of said chute.

2. In an article feed mechanism of the shuffle feed type a pair of spaced walls defining the side walls of a chute, one of said walls having an opening therein, a plurality of pusher flights mounted between said walls, means for reciprocating said pusher flights to advance articles step-by-step in a single file along said chute, at least one of said pusher flights being movable past the opening and having a formed marginal portion operative to urge articles laterally as they are moved longitudinally of said chute to thereby direct those articles adjacent the file into the opening.

3. In an article feed mechanism of the shuffle feed type, a pair of spaced walls defining the side walls of a chute, a plurality of stationary article storing flights mounted in parallel relation between said walls, said flights being spaced longitudinally of said chute and having upper generally flat ends disposed in stepped formation to define an ascending line of article-supporting surfaces, a pusher member mounted for reciprocating movement between each pair of article storing flights, means for reciprocating said pusher members in a direction generally parallel to said flights to advance articles from one article-supporting surface to the surface immediately above, and means providing an opening in one of said side walls adjacent the reciprocating pushers at the upper end of said chute whereby articles urged laterally by said pushers will be moved through said opening and discharged from said chute.

4. On article feed mechanism comprising a pair of spaced generally vertical plates defining side walls of a chute, a plurality of stationary article-supporting flights secured to and extending transversely in parallel relation between said plates, each stationary flight having an article-supporting shelf at one end, an article-advancing flight mounted for reciprocating movement between each pair of adjacent article-supporting flights, each movable flight having an article-pushing edge, means for reciprocating each movable flight from a lower position in which said pushing edge is in general alignment with the article-supporting shelf of the overlying stationary flight and an elevated position in which said pushing edge is in general alignment with the article-supporting shelf of the underlying stationary flight whereby articles carried on the shelf of said overlying stationary flight drop onto said movable flight when said movable flight is in lower position and are carried upwardly to the shelf of the underlying stationary flight as said movable flight reaches elevated position, and means providing an opening in one of said side walls extending alongside a plurality of reciprocating and stationary flights to receive articles urged laterally off said flights during reciprocation of said movable flights.

5. In an article feed mechanism of the shuffle feed type, a pair of spaced walls defining the side walls of a chute, a plurality of stationary article storing flights mounted in parallel relation between said walls, said flights being spaced longitudinally of said chute and having upright article-supporting end surfaces, a plurality of pushers having end pushing surfaces, one pusher being mounted for reciprocation between each pair of adjacent stationary flights, each of the end surfaces of said pushers and of said stationary flights being formed by a curved wall portion having an inclined wall portion on each side thereof whereby a pocket is formed on each end surface, means for reciprocating said pushers from a lower position adapted to receive an article from the storage end surface of the stationary flight therebelow to an elevated position adapted to deposit each article on the storage end surface of the stationary flight immediately above, the inclined wall portions of said stationary flights and said pushers being adapted to urge each article toward the associated curved central wall portions to center the articles in the pockets, and means defining an opening in one of said side walls adjacent the path of reciprocating movement of said pushers whereby articles urged laterally toward said one side wall incident to an adjacent article moving toward centered position will pass through said opening and be discharged from the chute leaving said adjacent article in centered position.

6. In an article feed mechanism of the shuffle feed type in which a plurality of spaced pushers are mounted between a pair of side walls of a chute for reciprocating movement relative to a plurality of stationary article-storing flights to advance articles step-by-step from one article-storing flight to the next, the improvement which comprises an article-contacting end surface on certain of said pushers including a first and a second inclined side wall portion and a central portion disposed between said inclined side wall portions, said first inclined wall portion being of less height than said second inclined wall portion measured in the direction of movement of said pushers, said second wall portions being effective to urge articles inwardly toward said central wall portion as the articles are advanced by said pushers while said second wall portions permit movement of the articles laterally off said pushers, and means defining an opening in one of said side walls adjacent the path of movement of at least one of said certain pushers to receive articles urged laterally over said second wall portions as they are advanced longitudinally of said chute.

7. In an article feed mechanism of the shuffle feed type, a pair of spaced walls defining the side walls of a chute, a plurality of pushers mounted for reciprocating movement between said side walls to advance articles step-by-step along said chute, and means for reciprocating said pushers, each pusher having a forward article-contacting end face including a central curved wall portion and an inclined wall portion on each side of said central portion, said wall portions defining an upwardly opening socket, the inclined wall portion on one side of the pocket of certain of said pushers being approximately half as high as the inclined wall at the other side of the pocket, the full size inclined walls being adapted to urge articles upwardly toward the center of the pocket as the articles are advanced by said pushers while the half size inclined walls permit movement of the articles laterally off said pushers, and means defining an opening in the side wall of said chute adjacent the path of movement of said half size wall portions to receive articles moving laterally of said chute over said half size wall portions.

8. In an article feed mechanism of the type in which each of a plurality of pusher members disposed between a pair of spaced side walls of a chute reciprocates between a forward stationary flight and a rearward stationary flight to advance articles step by step from a position in front of the forward edge of the rearward flight to a position in front of the forward edge of the forward flight, the improvement which comprises a pair of article-pushing surfaces on the forward end of said pusher including a first surface defining the foremost edge of said pusher and a second surface disposed rearwardly from said foremost edge whereby when articles are advanced simultaneously by said first and second pushing surfaces, the article associated with said first surface will reach the edge of the forward stationary flight and will drop over said edge before the article being advanced by said second surface is in position to drop over said edge, and means defining an opening in one of said side walls adjacent the path of movement of said reciprocating pusher to receive articles urged laterally as they are advanced in the chute.

References Cited in the file of this patent
UNITED STATES PATENTS

| | | |
|---|---|---|
| 1,992,331 | Smith | Feb. 26, 1935 |
| 2,298,829 | McCann | Oct. 13, 1942 |
| 3,058,616 | Loveland | Oct. 16, 1962 |